Figure 1:
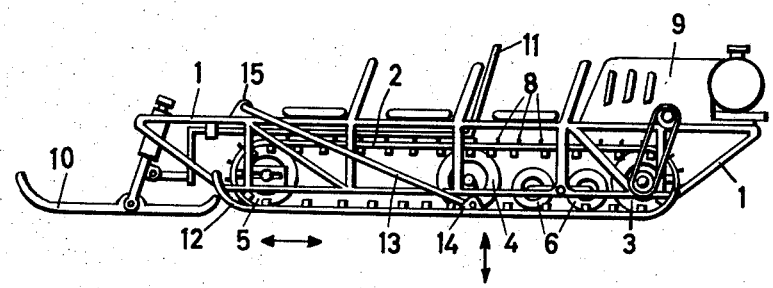

Nov. 24, 1959  A. F. SKULLERUD  2,914,126
SLED DRIVEN BY ENDLESS TREAD
Filed Sept. 30, 1957

United States Patent Office 2,914,126
Patented Nov. 24, 1959

2,914,126
SLED DRIVEN BY ENDLESS TREAD
Arne Fridtjof Skullerud, Oslo, Norway
Application September 30, 1957, Serial No. 687,117
1 Claim. (Cl. 180—5)

This invention relates to snowmobiles and more particularly to a self-propelled vehicle adapted to travel on snow, carrying load or passengers.

The present invention relates to a snowmobile having a structural frame, supporting seats or a load platform, a single, endless track driven by a motor and outrigger skis disposed on each side of the track.

It is previously known to provide snowmobiles wherein the outrigger skis are rigidly attached to the structural frame and the endless track is movable in the frame and pressed against the snow-covered ground by spring action or by means of movable arms, whereby the weight of the frame and the load is divided between the endless track and the skis.

In another known construction of snowmobiles the endless track is mounted on the frame and the skis are pivotally attached to the frame in such a manner that each ski may move in relation to the other.

Both of these known constructions involve disadvantages when travelling across rough country, as skis which are rigidly mounted on the structural frame, due to the unevenness of the ground, frequently tend to lift the frame so far from the ground that the tractive efficiency of the vehicle will be unduly reduced as a smaller area of the track then will contact the ground.

Snowmobiles having independently movable skis are on the other hand very difficult and exhausting to operate, as the driver has to control the skis with his feet.

Consequently, one object of the invention is to provide a snowmobile having track and outrigger skis operatively related to each other in such a manner that the track will exert its full tractive effort irrespective of the condition of the ground.

Another object of the invention is to provide a snowmobile, which is easy to operate and which makes possible a correct distribution of the load between the track and the skis.

Still another object is to provide a snowmobile which will have good stability against overturning. These objects are achieved in accordance with the invention by causing the skis on each side of the track and the frame to move together by means of mechanical interconnection. This provides for a good transverse stability, and further in accordance with the invention there is mounted springs between the skis and the frame, said springs pressing the skis against the snow. This feature causes the skis to support a certain part of the load on the frame or the load platform. Another feature of the invention is that the skis may pivot in a point positioned in front of the center of gravity of the frame, whereby the front load on the vehicle partly will be transferred to the skis.

The above mentioned requirements are fulfilled in accordance with the invention by the feature that pivotable arms, one on each side of the frame are rigidly connected to each other by a transverse shaft which is rotatably mounted in the frame, suitable spring means being provided to press the arms and thereby the skis against the snow.

Said transverse shaft is preferably located on the frame adjacent its front end. The invention thus consists in a snowmobile which comprises a structural frame adapted to carry the load, an endless track secured to and supporting the frame, a motor for propulsion of the vehicle, skis on each side of the track pivotally mounted on the free ends of arms attached to the structural frame, said arms being positively interconnected by means of a transverse shaft supported by bearings on the frame and rigidly secured to the arms, which by the action of spring means are adapted to press the skis against the ground.

Figure 2:
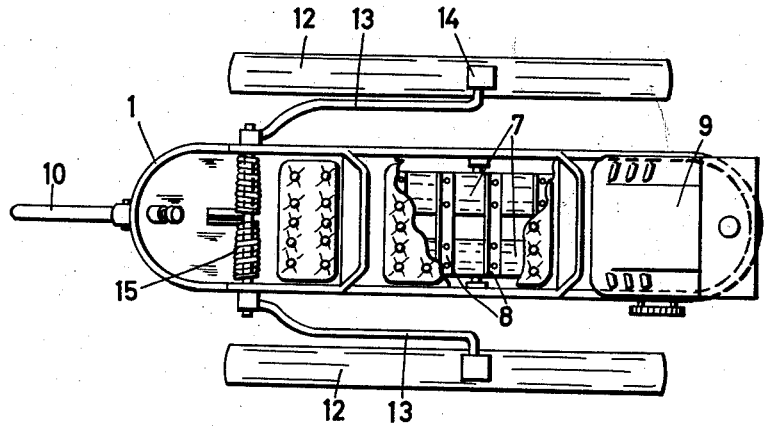

One embodiment of the invention will be described in detail in the following, with reference to the accompanying drawings, in which:

Figure 1 is a side view of a snowmobile in accordance with the invention, and
Figure 2 is a top view of the vehicle in Fig. 1.

The snowmobile comprises a structural frame 1 which may be of a welded tubular construction in which an endless track 2 is supported.

The endless track runs over a driving wheel 3, a guiding wheel 4, a tightening wheel 5 and two smaller guiding wheels 6. They are all pneumatic wheels. The track consists of two endless balata belts 7, connected to each other by means of angle iron pieces 8 with one side of the angle iron attached to the belts 7, while the other side forms the gripping means on the track. An internal combustion engine 9 is located at the rear end of the frame and drives through clutch and gear box the driving wheel 3. In front of the track there is positioned a steerable, sharp skate 10, which by means of a telescopic arrangement is pressed against the snow-covered ground. The skate 10 may be turned by means of steering device 11 in order to steer the vehicle. The skis 12 are pivotally attached to the free ends 14 of arms 13 on each side of the frame, and these arms are by means of a transverse shaft rigidly interconnected, so that the skis will move up or down simultaneously. The shaft is in the embodiment shown provided with a helical spring 15, which urges the arms 13 in Figure 1 to move clockwise and thereby to press the skis 12 against the snow-covered ground.

With this arrangement the endless track will always be in contact with the ground, as the skis will move up and down in accordance with the obstructions in the terrain, and as the skis are positively interconnected there is no need for the driver of the vehicle to control same.

The invention may be embodied in other specific forms without departing from the spirit thereof. The present embodiment is consequently to be considered in all respects as illustrative and not restrictive, the scope of the invention being indicated by the appended claim, and all changes which may be regarded as equivalent of the contents of the claim, are therefore intended to be embraced therein.

I claim:

A snowmobile comprising a frame, an endless track connected to said frame and having a horizontal portion extending beneath the same to support the frame above the ground surface, means for driving said endless track to propel the snowmobile over the ground, a unitary horizontal transverse shaft rotatably connected to said frame in front of the center of gravity thereof, the ends of said transverse shaft extending laterally beyond the sides of said frame, arms rigidly secured at one end to the ends of said transverse shaft to form a rigid substantially U-shaped member therewith, skis pivotally connected to the free ends of said arms, and a helical spring wound concentrically about said transverse shaft rotatably biasing said shaft in a direction to cause simultaneous pivotal engagement of the skis with the ground surface.

References Cited in the file of this patent

UNITED STATES PATENTS

| | | |
|---|---|---|
| 2,702,088 | Klimek | Feb. 15, 1955 |

FOREIGN PATENTS

| | | |
|---|---|---|
| 70,002 | Norway | Feb. 4, 1946 |
| 49,180 | Sweden | Sept. 25, 1918 |
| 118,365 | Switzerland | Jan. 3, 1927 |
| 291,079 | Switzerland | Sept. 1, 1953 |